(12) United States Patent
Fain et al.

(10) Patent No.: US 8,567,208 B2
(45) Date of Patent: Oct. 29, 2013

(54) WATER CHILLER

(76) Inventors: Alexander Fain, San Francisco, CA (US); Michael Kudatsky, San Francisco, CA (US)

(*) Notice: Subject to any disclaimer, the term of this patent is extended or adjusted under 35 U.S.C. 154(b) by 311 days.

(21) Appl. No.: 13/135,855

(22) Filed: Jul. 16, 2011

(65) Prior Publication Data

US 2013/0014929 A1 Jan. 17, 2013

(51) Int. Cl.
*F25B 25/00* (2006.01)

(52) U.S. Cl.
USPC ............................... 62/332; 62/389

(58) Field of Classification Search
USPC ............ 62/332, 389, 393, 394, 396, 157; 165/287, 104.11; 222/146.6
See application file for complete search history.

(56) References Cited

U.S. PATENT DOCUMENTS

| | | | | |
|---|---|---|---|---|
| 3,635,040 | A * | 1/1972 | Morris, Jr. | 62/219 |
| 4,471,631 | A * | 9/1984 | Anstey et al. | 62/177 |
| 4,993,233 | A * | 2/1991 | Borton et al. | 62/155 |
| 5,551,248 | A * | 9/1996 | Derosier | 62/155 |
| 6,349,552 | B2 * | 2/2002 | Shimoda et al. | 62/183 |
| 6,609,391 | B2 * | 8/2003 | Davis | 62/393 |
| 6,644,068 | B2 * | 11/2003 | Guckin | 62/513 |
| 6,912,867 | B2 * | 7/2005 | Busick | 62/338 |
| 7,055,262 | B2 * | 6/2006 | Goldberg et al. | 34/86 |
| 7,234,316 | B2 * | 6/2007 | Tien | 62/305 |
| 7,356,997 | B2 * | 4/2008 | Gruber et al. | 62/157 |
| 7,480,542 | B2 * | 1/2009 | Kroeger et al. | 700/202 |
| 8,105,439 | B2 * | 1/2012 | Liu et al. | 134/17 |

* cited by examiner

*Primary Examiner* — Mohammad M Ali
(74) *Attorney, Agent, or Firm* — Henry M. Feiereisen, LLC

(57) ABSTRACT

A water cooler has a heat exchanger; a water inlet line through which water is supplied to the heat exchanger and a water outlet line through which the water flows out of the latter; a cooling medium supply line which supplies a cooling medium to the heat exchanger so that in the heat exchanger the water is cooled in the heat exchange with the cooling fluid.

3 Claims, 1 Drawing Sheet

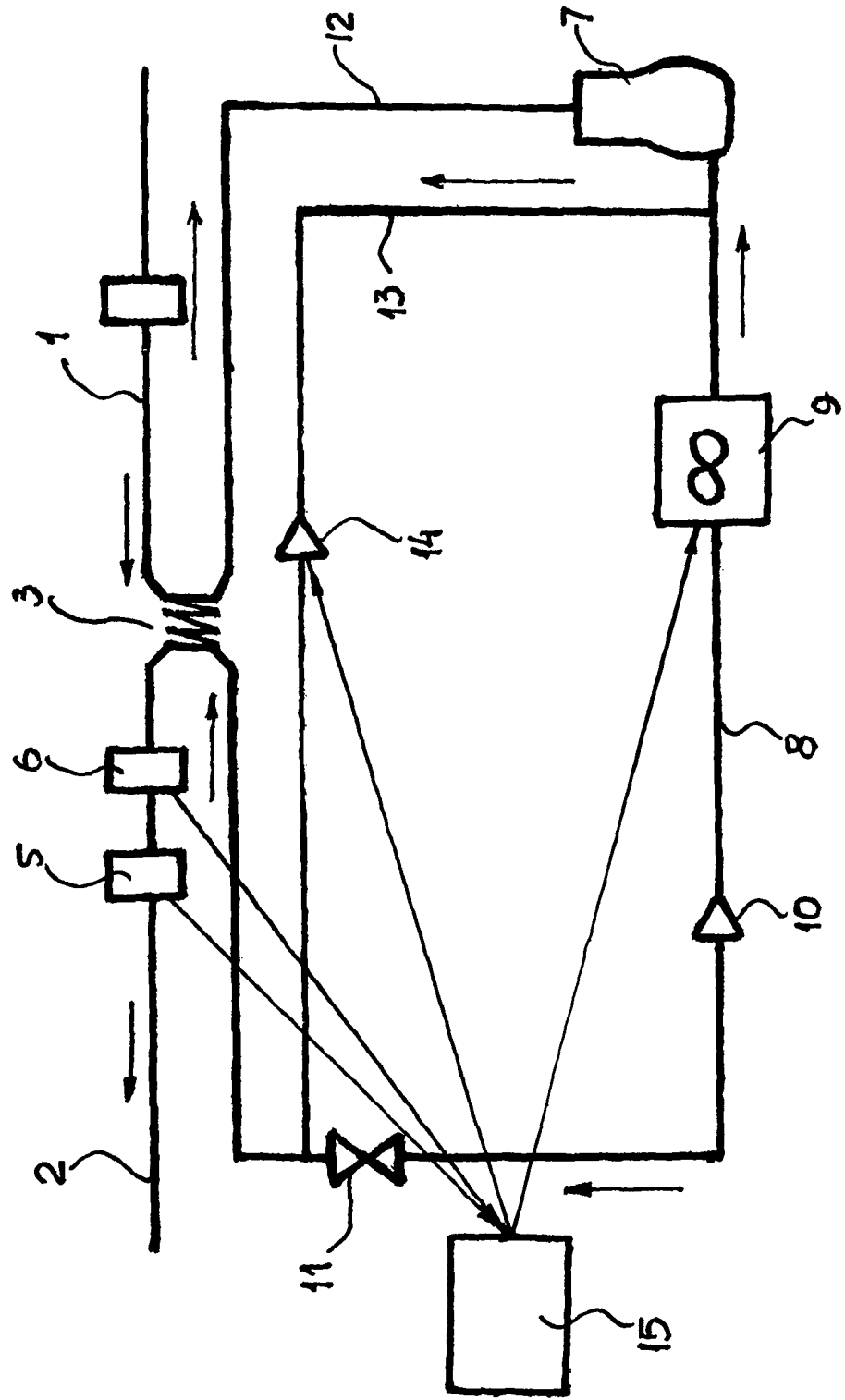

WATER CHILLER

BACKGROUND OF THE INVENTION

The present invention relates to water chillers, for example for use in bakeries.

Various water chillers are now known in the art and used in the bakeries. Many existing chillers possess various disadvantages, such as complicated constructions, difficulties in operation, stoppages due to unreliable operational cycles, etc.

It is believed that the existing water chillers can be further improved.

SUMMARY OF THE INVENTION

Accordingly, it is an object of the present invention to provide a water chiller which is a further improvement of the existing water chillers.

In keeping with these objects and with others which will become apparent hereinafter, one feature of the present invention resides, briefly stated, in a water chiller which has a heat exchanger passes-through the latter, and flows out of the heat-exchanger; a water supplying line through which water is supplied to said heat exchanger; a cooling medium supply line which supplies a cooling medium to said heat exchanger so that in said heat exchanger the water is cooled by a heat exchange with the cooling fluid.

Another feature of the present invention resides, briefly stated, in the water chiller has means for sensing a temperature of the water exiting said heat exchanger, and means for controlling a supply of the cooling fluid depending on the temperature sensed by said water temperature sensing means.

A further feature of the present invention resides, briefly stated, in that the water chiller has means for metering a water flow of the water flowing out of said heat exchanger, and means for controlling a quantity of a hot gas produced from the cooling medium after it heated the water, which hot gas controlled by said controlling means is supplied to said heat exchanger.

Still a further feature of the present invention resides, briefly stated, in the water chiller in which said controlling means include a PID loop, a liquid line solenoid opens for supplying the cooling medium, and a stepper valve, which is adjustable to provide the required quantity of the cooling fluid.

Still an additional feature of the present invention resides, briefly stated, that the controlling means includes a hot gas solenoid located in a line supplying the hot gas and opened by a signal provided from said water meter.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view showing a water chiller in accordance with the present invention.

DESCRIPTION OF THE PREFERRED EMBODIMENTS

A water chiller in accordance with the present invention has a water inlet line which is identified with reference numeral 1 and a water outlet line which is identified with reference numeral 2. Water flows through the water inlet line into a heat exchanger which is identified with reference numeral 3 and exits the heat exchanger through the water outlet line 2.

A pressure valve 4 is located in the water inlet line, while a water temperature probe 5 and a water meter 6 are located in the water outlet line.

The water in the water chiller in accordance with the present invention is cooled by a cooling medium, for example Freon which is supplied by a compressor 7. The compressor 7 supplies the cooling fluid through a cooling fluid line 8 into the heat exchanger 3. A PID loop 9, a liquid line solenoid 10 and a stepper valve 11 are located in the cooling fluid supply line 8.

When the cooling liquid passes through the heat exchanger 3, it cools the water, it is heated by the water, and it flows out through the cooling fluid outlet line 12 to the compressor 7 which compresses the heated cooling fluid and supplies it into a line 13 in form of a hot gas, which line 13 is provided with a hot gas solenoid 14.

The temperature probe 5 senses the temperature of the water which leaves the heat exchanger and is supplied to a user. If for example the temperature in the line 2 is below a required temperature, then a signal is supplied from the temperature probe 5, preferably to a computer 15, and the computer 15 controls the PID loop and opens the liquid line solenoid 10 and the stepper valve 11 to supply the required additional quantity of the cooling fluid to the heat exchanger by a correspondingly adjusted stepper valve.

In the event if the water meter 6 determines that a quantity of water flowing through the water outlet pipe 2 is below the required quantity, which means that an ice is formed around the heat exchanger, the water meter 6 sends a signal, preferably to a computer 15, which in turn opens the hot gas solenoid 14 and the hot gas is supplied to the heat exchanger so as to melt the ice produced in its area.

As a result, the water chiller operates reliably, supplies to a user water with the desired temperature and quantity, and prevents stoppages of the system due to the ice generation.

It will be understood that each of the elements described above, or two or more together, may also find a useful application in other types of constructions differing from the type described above.

While the invention has been illustrated and described as embodied in water chillers, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A water cooler, comprising a heat exchanger; a water inlet line through which water is supplied to said heat exchanger and a water outlet line through which the water flows out of the latter; a cooling medium supply line which supplies a cooling medium to said heat exchanger so that in said heat exchanger the water is cooled in said heat exchange with the cooling fluid, means for metering a water flow of the water flowing out of said heat exchanger: means for controlling a quantity of a hot gas produced from the cooling medium after it heated the water, which hot gas controlled by said controlling means is supplied to said heat exchanger, wherein said controlling means includes a hot gas solenoid located in a line supplying the hot gas produced from the cooling medium and open by a signal provided from said water meter.

2. The water cooler as defined in claim 1, and further comprising means for sensing a temperature of a water flowing out of said heat exchanger, and means for controlling a supply of the cooling fluid depending on the temperature sensed by said temperature sensing means.

3. The water cooler as defined in claim 2, wherein said controlling means include a PID loop, a liquid line solenoid which for supplying the cooling medium is opened, and a stepper valve, which is adjustable to provide the required quantity of the cooling fluid.

* * * * *